United States Patent [19]

Gnaedinger

[11] Patent Number: 4,496,267
[45] Date of Patent: Jan. 29, 1985

[54] LIME OR LIME:FLY ASH PRETREATED PAVEMENT CONSTRUCTION MATERIAL AND METHOD

[75] Inventor: John P. Gnaedinger, Kenilworth, Ill.

[73] Assignee: John P. Gnaedinger Research Corporation, Kenilworth, Ill.

[21] Appl. No.: 450,560

[22] Filed: Dec. 16, 1982

[51] Int. Cl.$^3$ .................... E01C 19/00; C04B 7/14; C04B 1/00; C04B 7/34
[52] U.S. Cl. .................................. 404/82; 106/118; 106/117; 106/120; 106/900; 405/128
[58] Field of Search ............... 106/117, 118, 119, 120, 106/109, 110, 900; 404/75, 76, 82; 405/128, 129

[56] References Cited

U.S. PATENT DOCUMENTS

| | | | |
|---|---|---|---|
| 1,942,770 | 1/1934 | Peffer | 106/119 |
| 2,815,294 | 12/1957 | Havelein | 106/118 |
| 3,076,717 | 2/1963 | Minnick | 106/118 |
| 3,293,999 | 12/1966 | Gnaedinger | 106/118 |
| 4,018,619 | 4/1977 | Webster | 106/120 |
| 4,038,095 | 7/1977 | Nicholson | 106/120 |
| 4,373,958 | 2/1983 | Jones et al. | 106/118 |

FOREIGN PATENT DOCUMENTS 53-144460  12/1978  Japan .................................. 106/117

Primary Examiner—Gary P. Straub
Attorney, Agent, or Firm—McDougall, Hersh & Scott

[57] ABSTRACT

A composition for use as a base course in a pavement construction is prepared by prereacting uncompacted incinerator ash with 2–10% by weight lime or 2–10% by weight of a 2:3 lime:fly ash mixture for several days and then adding 2–10% by weight lime and 20–25% by weight water to the composition before compaction.

6 Claims, No Drawings

LIME OR LIME:FLY ASH PRETREATED PAVEMENT CONSTRUCTION MATERIAL AND METHOD

BACKGROUND OF THE INVENTION

There are at least three important elements involved in the formation of pavement constructions which carry vehicular traffic. Those elements include (a) the subgrade or supporting soil which can comprise a natural deposit or man-made fill, (b) a base course located above the subgrade which transmits the pressures exerted by the vehicle to the subgrade, and (c) a surface course, located above the base course, which is in direct contact with the vehicle.

The operation of the base course in a concrete pavement is not particularly critical since the concrete is quite rigid, and, therefore, shearing stresses in the base course are minimal. In the case of flexible pavement, however, the base course functions to transmit relatively high stresses to the subgrade. Thus, the nature of the base course is critical if a flexible pavement construction is used.

Some current construction practices involve the use of crushed stone or other granular materials for base courses. These aggregates, however, exhibit a lack of cohesion, are subject to densification under traffic conditions, and have relatively low shearing strengths under concentrated loads. A significant development in the prior art involves the use of a mixture of lime, an aggregate (such as crushed stone, gravel-containing soil or slag), and fly ash—these mixtures have been satisfactory from most standpoints. However, materials employed in these compositions are expensive either due to their scarcity or to the production and handling costs.

It is an object of this invention to utilize the material produced from the incineration of municipal waste as a component of a base course construction, and to avoid the need to dispose of that material in landfill sites.

It is another object of this invention to provide an improved material for pavement construction that is economical to produce and which can be employed in an efficient fashion.

It is an additional object of this invention to provide a material which is particularly suitable for use as the base course located beneath flexible pavement constructions for the reason that the material possesses the requisite strength for distributing loads on the pavement.

It is a further object of this invention to provide a material for use as a base course in flexible pavement constructions which is economical to produce, which comprises a minimum of relatively inexpensive ingredients and which can be handled and utilized in a highly efficient manner.

These and other objects of this invention will appear hereinafter, and it will be understood that the following examples are provided for purposes of illustration and not by way of limitation.

SUMMARY OF THE INVENTION

A material for use as a base course in a pavement construction is provided by prereacting uncompacted incinerator ash with 2-10% by weight lime or 2-10% by weight of a 2:3 lime:fly ash mixture for several days, and then mixing from 2 to 10% by weight lime and 10-25% by weight water with pre-reacted incinerator ash before compaction. The incinerator ash comprises the reaction product formed upon burning refuse in a rotary kiln furnace or other high performance incinerator at a temperature between about 1600° F. and 2000° F. The ash is of the type which will pass through a ¾ inch to one inch screen prior to use for the removal of large metal pieces.

DETAILED DESCRIPTION OF THE INVENTION

The incinerator ash must have the following properties. Specifically, the ash is the reaction product formed upon burning miscellaneous refuse and garbage in a slowly rotating kiln-type furnace preferably at a temperature of about 1800° F. Residue from walking grate incinerators will also provide satisfactory residue if the incinerator is properly operated and the residue is burned thoroughly. After burning, the product is washed through a ¾ to one inch screen whereby large pieces of metal and other large fragments are removed. In the final product, about 60 to 90 percent of the ash passes through a No. 4 (3/16 inch) screen, 10 to 30 percent passes through a No. 30 screen, 2 to 12 percent passes through a 100-mesh screen, and from 1.5 to 8 percent passes through a 200-mesh screen.

A typical analysis of incinerator ash produced in accordance with the above technique that is suitable for use in this invention is presented in Table I.

TABLE I

| | |
|---|---|
| Silica ($SiO_2$) | 55% by weight |
| Alumina ($Al_2O_3$) | 9% by weight |
| Iron Oxide ($Fe_2O_3$) | 9% by weight |
| Calcium Oxide (CaO) | 10% by weight |
| Magnesium Oxide (MgO) | 2% by weight |
| Soluble Salts | 1.2% by weight |
| Total Sulfates | 0.5% by weight |
| Loss on Ignition | 15% by weight |
| Specific Gravity | 2.57 |

As used herein, "loss on ignition" indicates the organic content of the residue after combustion since the reduction in weight after ignition corresponds to the amount of organic materials which reacted and were evolved in gaseous form during ignition.

The incinerator ash having the characteristics necessary for the practice of this invention is different in certain material respects from the fly ash employed in the prior art. First, incinerator ash can be distinguished from fly ash in size characteristics since fly ash, in order to be suitable for the reaction described in the prior art, must be an extremely fine material. That reaction, referred to as a pozzolanic reaction, requires an ash, 98% of which will pass through a No. 30 screen and 70% of which will pass through a No. 200 screen.

Fly ash is also obtained from a completely different source; namely, as the finely divided residue resulting from the combustion of powdered coal. That residue is referred to as a pozzolan which is a siliceous or alumino-siliceous material. The above noted specifications for fly ash are found in ASTM Designation: C379-56T.

As will appear from the following description, incinerator ash, to be suitable for use with lime in this invention, must be capable of undergoing a reaction which is different from the pozzolanic reaction that characterizes the use of fly ash. It is for this reason that the incinerator ash of this invention must have the foregoing characteristics—ashes recovered from an incinerator will not react according to this invention unless they possess those characteristics.

The incinerator ash residue differs from a fly ash system which includes the residue obtained from the combustion of powdered coal, this residue consisting of finely divided, burned shale.

The lime used in the present invention can be selected from the various well-known hydrated limes in an amount up to about 10% by weight. Quick lime also produces satisfactory results although it is usually avoided due to the health hazards attendant the use of this material. Flue dust lime, containing approximately 40% calcium oxide, can also be used in increased amounts whereby the desired lime content will be provided.

A preferred lime comprises monohydrated dolomitic lime which consists of a mixture of $Ca(OH)_2$ and $MgO$. Fully hydrated lime is also contemplated as suitable for use in the composition.

As described in U.S. Pat. No. 3,293,999, various experiments have been conducted which illustrate the characteristics and the advantageous properties of an ash lime mixture which is suitable for use in this invention. Those experiments indicate that the density of the mixture should be at least 85% of the density determined by ASTM Method D-1557. A density of 95% D-1557 or higher is preferred. To achieve this density, a water content of between 10 and 25% by weight and preferably between 18 and 23% by weight is recommended. Laboratory and field tests were conducted to determine the compressive strengths of the following mixtures:

TABLE II

| | Compressive Strength (ksc) | | |
|---|---|---|---|
| Day | Sample 1* | Sample 2** | Sample 3*** |
| 7 | 10.1 | 9.8 | 3.3 |
| 28 | 6.5 | 12.0 | 6.4 |
| 90 | 18.7 | 23.3 | 38.6 |

*Compacted incinerator ash and 8% lime.
**Uncompacted incinerator ash prereacted with 5% lime; after 4 days, 8% lime is added before compaction.
***Uncompacted incinerator ash prereacted with 5% of 2:3 lime: fly ash mixture; after 7 days, 8% lime is added before compaction. (All percentages are by weight.)

In the construction of pavement with a base course in accordance with this invention, the incinerator ash is first prereacted according to the above described technique. The incinerator ash is then mixed (a) with the lime in a mixing plant or in a truck mixer, (b) in place by discing and blading, or (c) by any other method which assures a uniform distribution of the lime in the incinerator ash. Moisture is added so that the total moisture at the time of compaction is approximately at the optimum point as determined by ASTM Method D-1557.

After the moisture and lime have been uniformly mixed into the volume of incinerator waste, the mixture is spread on the subgrade, preferably with a spreader box, bladed to an appropriate uncompacted thickness, and rolled by vibratory or other compaction equipment to a density of about 95% as determined by the above noted ASTM Method. The surface of the compacted base course may then be coated after placement with a light application of a bituminous primer material to minimize evaporation to cure the material, and to minimize infiltration of rain which might otherwise leach the surface.

Following application of the material, evolution of gases has been noted. This phenomena requires a delay in forming final surfacing as with asphaltic concrete or other flexible surfacing. If the final surfacing were applied immediately, the evolving gases may form voids under, or bursts in the surface.

The evolved gas is related to the chemical reactions which produce the hardening. Since no gas generation takes place when fly ash is employed, it is apparently a different reaction than pozzolanic. Because of that reaction, a delay of three days or more is necessary for sufficient evolution of the gases so that bursts in the surface are not formed. Although the reaction continues for an extended period, the amount of gases evolved after about three days is relatively small and the pressure increases are not great enough to damage the final surface.

The material of this invention, however, will not achieve its full strength until at least one month has passed. Therefore, traffic should be limited over the pavement for at least one week after placement to prevent a breakup of the material before setting has been completed.

The reaction of this invention is slow and extends over a period of several months. Therefore, the final strength of the base course will be appreciably higher than the strength after about one month. As above indicated, however, traffic can be allowed on a pavement construction which utilizes this invention before full strength has been achieved because the compacted base course can support appreciable loads for a significant time before full strength is achieved.

In the application of the incinerator ash-lime mixture of this invention as a base course, the density of the base course which should be specified will depend upon the character of the subgrade and upon the expected load and frequency of traffic. It is contemplated that conventional formulas which are available for the design of installations in parking lots, streets, highways, runways and the like will be utilized in determining the details of the base course construction.

As explained, it has been found desirable to apply a surface course over the base course of this invention as the base course will then more readily withstand the pressure and abrasion occasioned by the passage of vehicles. Following common pavement construction practices, the incinerator ash-lime base course can be primed through the application of a cut-back asphaltic material, using either a medium curing or rapid curing liquid asphalt. About 0.1 to 0.2 gallons per square yard of this liquid asphalt may be employed. After a curing period of at least 24 hours, a wearing course, consisting of 1 to 3 inches is provided as the flexible pavement. If traffic will use the surface formed according to the present invention before paving, the surface should not be primed. The thickness of this wearing course will depend on the expected traffic load on the construction.

In some instances, the surface of the base course of this invention can be sealed by the application of a bituminous surface treatment which includes the alternate application of bituminous material and aggregate. Again, the use of a surfacing of this nature will depend on the anticipated traffic load for the particular location.

This invention has the advantage over materials using fly ash as a base course in that no crushed stone, gravel, or slag is needed as an additive. The incinerator ash serves both as aggregate and as the chemical material which reacts with the lime.

This invention offers a further advantage in that the incinerator ash, which normally must be disposed of at a considerable cost to dump sites frequently located many miles from the incinerator plant, can now have an economic value. Thus, a high quality base course is produced at a significantly lower cost than the pozzolanic base courses; and, in most cases, at a lower cost than crushed stone bases, and with a substantial savings in energy. The above description is believed to illustrate the improvements which can be achieved in the formation of flexible pavement constructions. It is also to be understood, however, that these compositions are highly suitable for use as a base course for concrete pavement and also find utility without a surface course and these applications are therefore contemplated.

It will further be understood that various changes and modifications can be made in the above-described invention which provide the characteristics of this invention without departing from the spirit thereof particularly as defined in the following claims.

That which is claimed is:

1. In a method for the formation of a pavement construction wherein a base course is disposed in overlying relationship with respect to a subgrade, the improvement comprising a method for forming said base course, said method comprising the steps of reacting uncompacted incinerator ash for several days with 2–10% by weight of a pretreatment agent consisting essentially of lime, adding a binding mixture consisting essentially of 2–10% by weight lime and 20–25% by weight water, and disposing the mixture over said subgrade, said incinerator ash comprising the product achieved by burning refuse in an incinerator at a temperature between 1600 and 2000° F. to form a residue wherein the incinerator ash recovered from the incinerator is sifted prior to use through a ¾ inch to 1 inch screen, the resulting ash having a typical particle size distribution wherein 60 to 90% of the ash passes through a No. 4 screen, 10 to 30% of the ash passes through a No. 30 screen, 2 to 12% of the ash passes through a 100-mesh screen, and 1.5 to 8% will pass through a 200-mesh screen, wherein the base course formed from said mixture is permitted to stand prior to actual use, and wherein a reaction between the lime and residue content of said incinerator ash takes place during such period.

2. A method in accordance with claim 1 wherein the residue is formed in a rotary kiln.

3. A method in accordance with claim 1 including the step of applying a flexible surface over said base course, and wherein application of said final surface is delayed to permit evolution of gases formed during the reactions which occur as the material hardens.

4. In a method for the formation of a pavement construction wherein a base course is disposed in overlying relationship with respect to a subgrade, the improvement comprising a method for forming said base course, said method comprising the steps of reacting uncompacted incinerator ash for several days with 2–10% by weight of a pretreatment agent consisting essentially of a 2:3 lime:fly ash mixture, adding a binding mixture consisting essentially of 2–10% by weight lime and 20–25 by weight water, and disposing the mixture over said subgrade, said incinerator ash comprising the product achieved by burning refuse in an incinerator at a temperature between 1600 and 2000° F. to form a residue wherein the incinerator ash recovered from the incinerator is sifted prior to use through a ¾ inch to 1 inch screen, the resulting ash having a typical particle size distribution wherein 60 to 90% of the ash passes through a No. 4 screen, 10 to 30% of the ash passes through a No. 30 screen, 2 to 12% of the ash passes through a 100-mesh screen, and 1.5 to 8% will pass through a 200-mesh screen, wherein the base course formed from said mixture is permitted to stand prior to actual use, and wherein a reaction between the lime and the residue of said incinerator and a pozzolanic reaction between the lime and the fly ash take place during such period.

5. A method in accordance with claim 4 wherein the residue is formed in a rotary kiln.

6. A method in accordance with claim 4 including the step of applying a flexible surface over said base course, and wherein application of said final surface is delayed to permit evolution of gases formed during the reactions which occur during the process.

* * * * *